US007949323B1

(12) United States Patent
Muhammad et al.

(10) Patent No.: US 7,949,323 B1
(45) Date of Patent: May 24, 2011

(54) LOCAL OSCILLATOR LEAKAGE COUNTERBALANCING IN A RECEIVER

(75) Inventors: Khurram Muhammad, Dallas, TX (US); Chih-Ming Hung, McKinney, TX (US); Imtinan Elahi, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1002 days.

(21) Appl. No.: 11/679,101

(22) Filed: Feb. 26, 2007

Related U.S. Application Data

(60) Provisional application No. 60/776,839, filed on Feb. 24, 2006, provisional application No. 60/776,587, filed on Feb. 24, 2006.

(51) Int. Cl.
*H04B 1/10* (2006.01)
(52) U.S. Cl. ......... 455/310; 455/296; 455/317; 455/318
(58) Field of Classification Search ........... 455/230–334
See application file for complete search history.

(56) References Cited

U.S. PATENT DOCUMENTS

| | | | | |
|---|---|---|---|---|
| 4,811,425 A * | 3/1989 | Feerst | ............................ | 455/317 |
| 5,001,773 A * | 3/1991 | White | ............................ | 455/118 |
| 5,918,167 A * | 6/1999 | Tiller et al. | ................... | 455/310 |
| 6,343,211 B1 * | 1/2002 | Thodesen et al. | ............. | 455/317 |
| 6,606,484 B1 * | 8/2003 | Faulkner | ........................ | 455/131 |
| 6,985,711 B2 * | 1/2006 | Holenstein et al. | ........... | 455/312 |
| 6,999,744 B2 * | 2/2006 | Kim | ................................ | 455/310 |
| 7,133,656 B2 * | 11/2006 | Tanaka | .......................... | 455/310 |
| 7,313,376 B1 * | 12/2007 | Hietala | ....................... | 455/232.1 |
| 7,542,519 B2 * | 6/2009 | McCallister | .................. | 375/297 |
| 7,693,242 B2 * | 4/2010 | Sobchak et al. | .............. | 375/349 |
| 7,817,979 B2 * | 10/2010 | Clark et al. | .................... | 455/311 |
| 7,818,028 B2 * | 10/2010 | Vassiliou et al. | ........... | 455/550.1 |
| 7,856,218 B2 * | 12/2010 | Akamine et al. | ........... | 455/234.1 |
| 2004/0203548 A1 * | 10/2004 | Kim | .......................... | 455/226.1 |
| 2005/0043001 A9 * | 2/2005 | Toncich et al. | ............... | 455/323 |
| 2007/0072571 A1 * | 3/2007 | Sun et al. | ....................... | 455/280 |

OTHER PUBLICATIONS

Elahi, et al, IIP2 and DC Offsets in the Presence of Leakage at LO Frequency, IEEE Transactions on Circuits and Systems—II: Express Briefs, vol. 53, No. 8, Aug. 2006, pp. 647-651.

* cited by examiner

*Primary Examiner* — Blane J Jackson
(74) *Attorney, Agent, or Firm* — John R. Pessetto; W. James Brady; Frederick J. Telecky, Jr.

(57) ABSTRACT

The present invention provides a local oscillator (LO) leakage controller for use with a receiver. In one embodiment, the LO leakage controller includes a comparison unit configured to process an LO leakage error signal from the receiver to provide a leakage cancellation signal. Additionally, the LO leakage controller also includes a leakage counterbalance unit coupled to the comparison unit and configured to adapt the leakage cancellation signal to the receiver to counterbalance LO leakage in the receiver.

23 Claims, 8 Drawing Sheets

LOCAL OSCILLATOR LEAKAGE COUNTERBALANCING IN A RECEIVER

CROSS-REFERENCE TO PROVISIONAL APPLICATIONS

This application claims the benefit of U.S. Provisional Application No. 60/776,587 entitled "A Method for LO Leakage Cancellation by Injecting RF Signal to Cancel the Supply Bounce" to Khurram Muhammad and Chih-Ming Hung, filed on Feb. 24, 2006, which is incorporated herein by reference in its entirety.

Additionally, this application claims the benefit of U.S. Provisional Application No. 60/776,839 entitled "A Method of LO Leakage Cancellation by Injecting The Canceling RF Signal Through Bondwires" to Khurram Muhammad and Imtinan Elahi, filed on Feb. 24, 2006, which is incorporated herein by reference in its entirety.

TECHNICAL FIELD OF THE INVENTION

The present invention is directed, in general, to communication systems and, more specifically, to a local oscillator leakage controller and a method of controlling the local oscillator leakage controller.

BACKGROUND OF THE INVENTION

Direct conversion in integrated circuit receiver architectures typically provides low power and low complexity compared to other architectures. This architecture converts the center of a received RF signal directly to DC in the first mixers. Salient blocks in a typical direct conversion receiver include a low noise amplifier (LNA), quadrature mixers that separate the received signal into in-phase (I) and quadrature-phase (Q) signal components, channel select filters, variable gain amplifiers and analog to digital converters (ADCs).

A major challenge in a direct conversion receiver, compared to a superheterodyne receiver, arises from the fact that the local oscillator (LO) signal, which drives the quadrature mixers, has to operate at the same frequency as the received signal in order to provide direct conversion. The LO signal can couple to different nodes in the receiver through parasitic capacitive and substrate coupling thereby providing an LO leakage signal. If the LO signal is generated remotely from the receiver, LO leakage can occur through bond wire coupling, as well.

LO leakage manifests itself in a variety of problems. If there is LO leakage to the receiver input, this signal is processed through the LNA and quadrature mixers to provide a spurious DC offset voltage at the mixer output. If this DC offset voltage is time invariant, it may filtered. However, since the amount of LO leakage is typically not constant (i.e., time variant) and gain through the LNA may vary over time, schemes to filter this DC offset voltage often prove ineffectual.

Additionally, if the LO leakage is radiated from the receive antenna and then reflected back from moving objects, it also causes time variant DC offsets, which are difficult to filter. A DC offset voltage of only a few millivolts at the mixer output may cause the receiver to saturate when a typical voltage gain of 40 dB to 70 dB is implemented at baseband frequencies. Even if the receiver is not saturated, the offset causes a reduced available dynamic range of the ADC.

Intermodulation distortion of the receiver describes its susceptibility to interfering signals. Both the LNA and the quadrature mixer produce second and third order intermodulation distortion. The second and third order intercept points (IP2, IP3) quantify a receiver's ability to maintain its fidelity in an environment of interfering signals. These intercept points are often referred to the receiver's input wherein the terms IIP2 and IIP3 are used. Increasing LO leakage causes IIP2 of the receiver to degrade. Therefore, LO leakage causes receiver degradation in the form of DC offset and IIP2. See, for example, "IIP2 and DC Offsets in the Presence of Leakage at LO Frequency," by I. Elahi, K. Muhammad and P. T. Balsara, Express Briefs, IEEE Transactions on Circuits and Systems II: Analog and Digital Signal Processing, Volume 53, Issue 8, August, 2006, Pages: 647-651.

Accordingly, what is needed in the art is an effective way to suppress the effects of LO leakage.

SUMMARY OF THE INVENTION

To address the above-discussed deficiencies of the prior art, the present invention provides a local oscillator (LO) leakage controller for use with a receiver. In one embodiment, the LO leakage controller includes a comparison unit configured to process an LO leakage error signal from the receiver to provide a leakage cancellation signal. Additionally, the LO leakage controller also includes a leakage counterbalance unit coupled to the comparison unit and configured to adapt the leakage cancellation signal to the receiver to counterbalance LO leakage in the receiver.

In another aspect, the present invention provides a method of operating a local oscillator (LO) leakage controller for use with a receiver. The method includes processing an LO leakage error signal from the receiver to provide a leakage cancellation signal and adapting the leakage cancellation signal to the receiver to counterbalance LO leakage in the receiver.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Several embodiments of the present invention are presented in the following discussions. In one embodiment, the power supply system of a receiver is employed to counterbalance ground/supply bounce associated with LO leakage. This approach radiates little or no energy outside the integrated circuit, when the counterbalancing signal is injected. An alternative embodiment injects a counterbalancing signal at the input of the low noise amplifier in the receiver. These approaches generally attempt to cancel the leakage energy at its source. Another embodiment employs bondwires in the receiver to inject a counterbalancing signal for LO leakage, which causes the LO signal to be radiated within the receiver.

Additionally, embodiments of LO leakage counterbalancing techniques are presented. These include dithering of the injection signal to enhance its amplitude resolution as well as time varying the injection signal to provide averaging of the injection signal.

Figure 1:
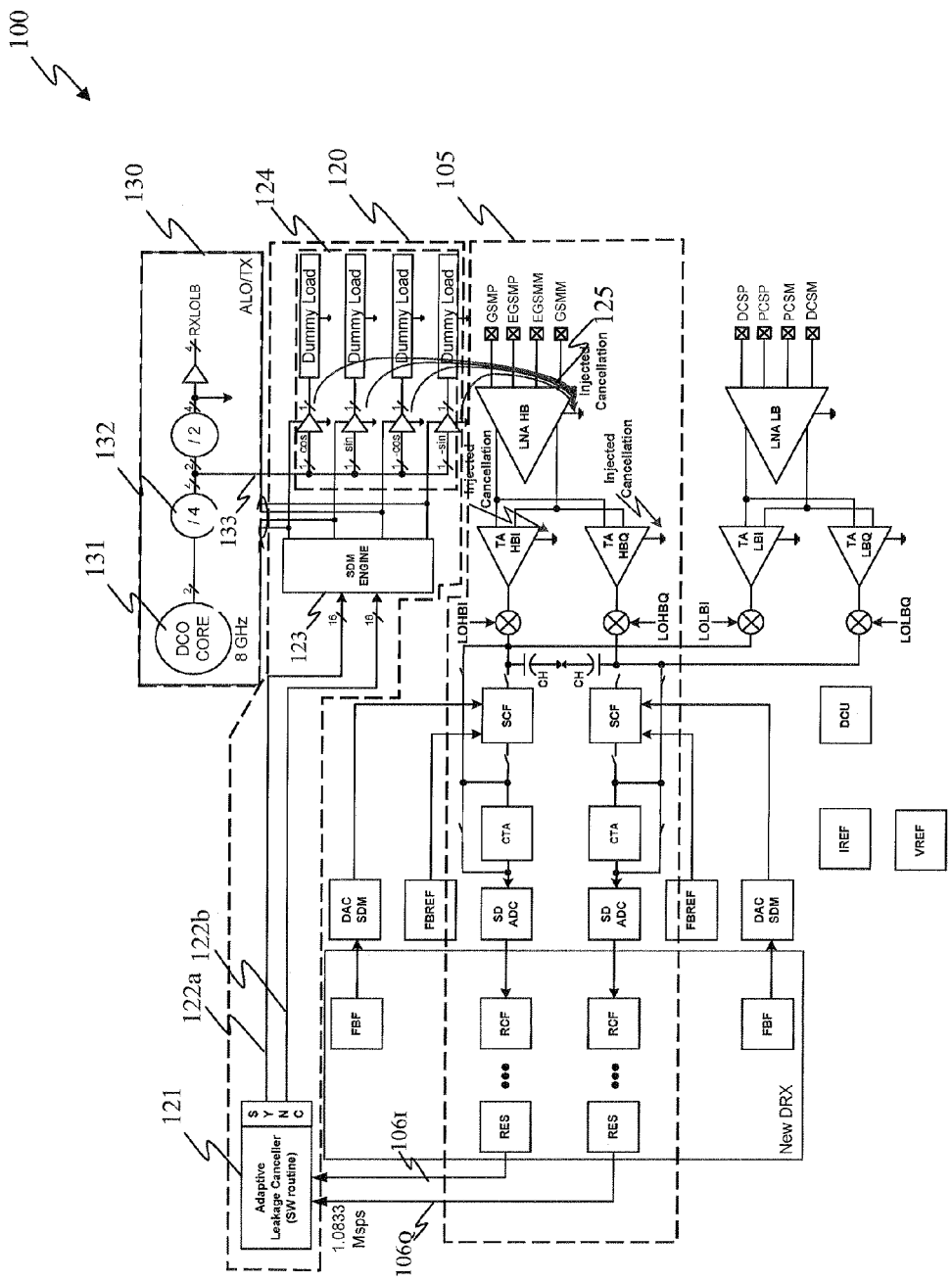
FIG. 1 illustrates a receiver as provided by one embodiment of the present invention.

FIG. 1 illustrates a receiver, generally designated 100, as provided by one embodiment of the present invention. The receiver 100 includes an exemplary receive channel 105, a local oscillator (LO) leakage controller 120 and an LO signal generator 130. The receive channel 105 includes a low noise amplifier (LNA) having differential signal outputs that are provided to an in-phase and a quadrature-phase transconductance amplifier (TA), respectively. The in-phase and quadrature-phase TAs provide output signals to in-phase and quadrature-phase mixers that employ in-phase and quadrature-phase local oscillator (LO) signals for down-conversion mixing. This mixing provides in-phase and quadrature-phase baseband signals that are further processed to provide in-phase and quadrature-phase analog-to-digital conversion (ADC) signals $106_I$, $106_Q$. The ADC signals $106_I$, $106_Q$ provide an LO leakage error signal 106 to the LO leakage controller 120.

The LO leakage controller 120 includes a comparison unit 121 consisting of an adaptive leakage canceller (ALC) that processes the LO leakage error signal 106 from the receive channel 105 to provide a leakage cancellation signal 122 having in-phase and quadrature-phase components 122a, 122b. The leakage cancellation signal 122 is provided to a leakage counterbalance unit consisting of a sigma delta modulation (SDM) engine 123 and LO signal buffers 124 that adapts the leakage cancellation signal 122 to counterbalance LO leakage in the receive channel 105.

The LO signal generator 130 includes a master oscillator 131 and a frequency divider 132 that provide an LO signal 133 to the LO signal buffers 124. The LO signal 133 is provided in four phases corresponding to cosine, sine, negative cosine and negative sine functions (i.e., I+, Q+, I− and Q−), as shown. In the illustrated embodiment, an adapted leakage cancellation signal 125 is provided to a ground system in the receive channel 105, as shown graphically in FIG. 1.

The comparison unit 121 (i.e., ALC) processes the LO leakage error signal 106 employing a software program, in the illustrated embodiment. Other embodiments may employ a firmware program or a hardwired program, as appropriate to a specific application. Additionally, the comparison unit 121 employs an algorithm to actively drive the LO leakage error signal 106 toward a lower value by injecting the adapted leakage cancellation signal 125. This algorithm may be a least square algorithm, a mean square error reduction algorithm or a zero forcing algorithm. Of course, the LO leakage reduction algorithm may be another well known or proprietary algorithm.

The LO leakage signal 106 becomes a DC signal after down-conversion by the mixer. The amplitude and phase of the LO leakage may be estimated from the DC levels of the ADC signals $106_I$, $106_Q$. The main role of the ALC is to measure the DC level in the baseband signal and calculate I and Q input values for corresponding digital-to-analog converters (DACs) in the SDM engine 123, which are used to synthesize an LO anti-leakage signal. The complex leakage cancellation signal 122 is sigma-delta modulated and converted to an over-sampled bit stream at approximately 125 mega-samples per second (Msps), in the illustrated embodiment. I and Q outputs from the SDM engine 123 are used to turn the LO signal buffers 124 ON and OFF.

When an LO signal buffer is turned ON, the input rising edge creates a current surge that "slams" the power system for the receive channel 105 with an impulse that is phase-aligned with the appropriate input LO signal 133 to the LO signal buffers 124 thereby generating ground bounce. Similarly, the input falling edge creates another current surge in the opposite direction.

Figure 2:
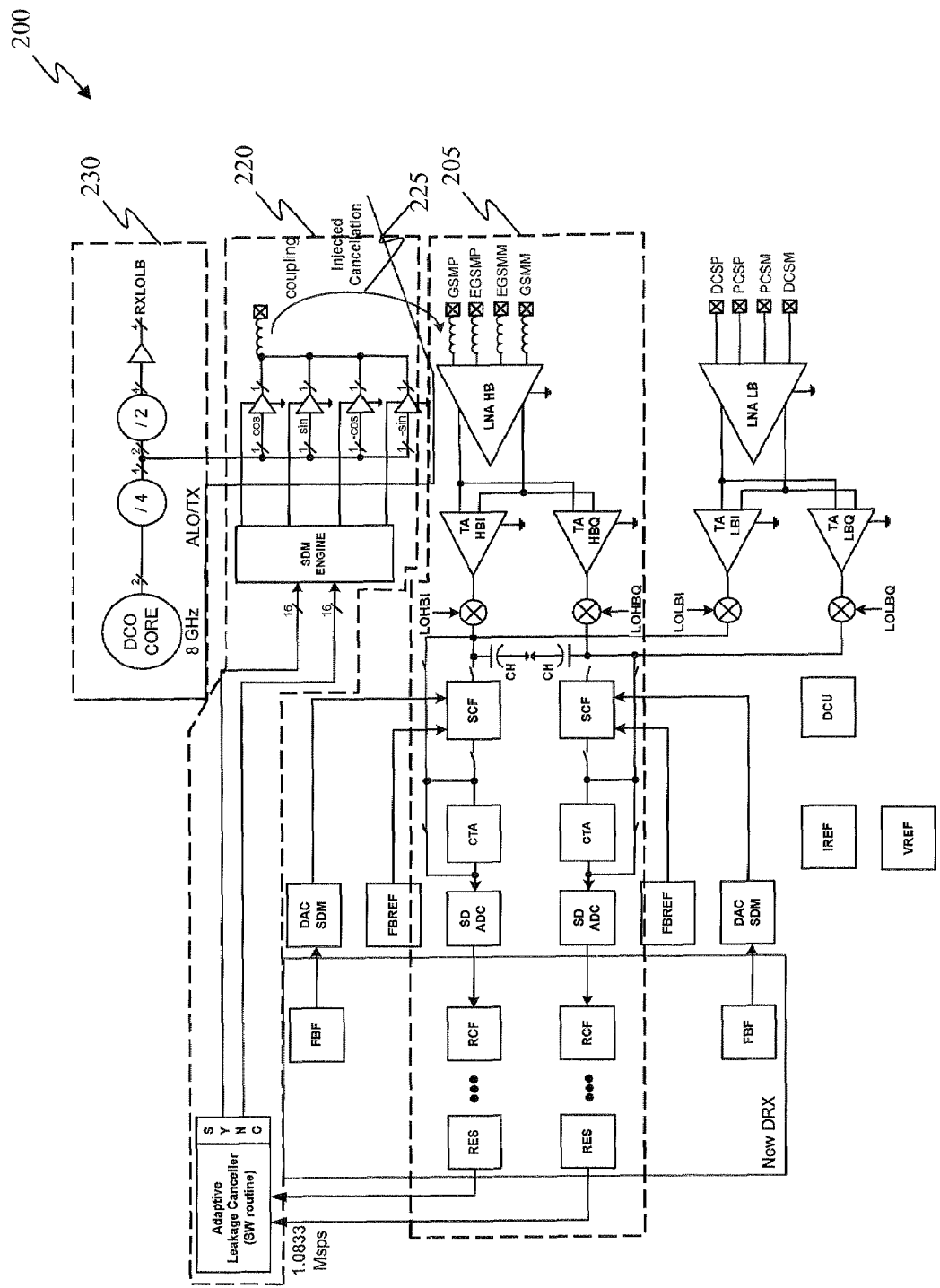
FIG. 2 illustrates an alternative receiver embodiment employing a different coupling of the adapted leakage cancellation signal.

FIG. 2 illustrates an alternative receiver embodiment, generally designated 200, employing a different coupling of the adapted leakage cancellation signal. The receiver 200 includes an exemplary receive channel 205, a local oscillator (LO) leakage controller 220 and a LO signal generator 230, as before, which operate in a manner that is analogous to their corresponding units in FIG. 1. However an adapted leakage cancellation signal 225 is coupled to the receive channel 205 through the use of bondwires contained in the receiver 200. The adapted leakage cancellation signal 225 is shown symbolically in FIG. 2.

Figure 3:
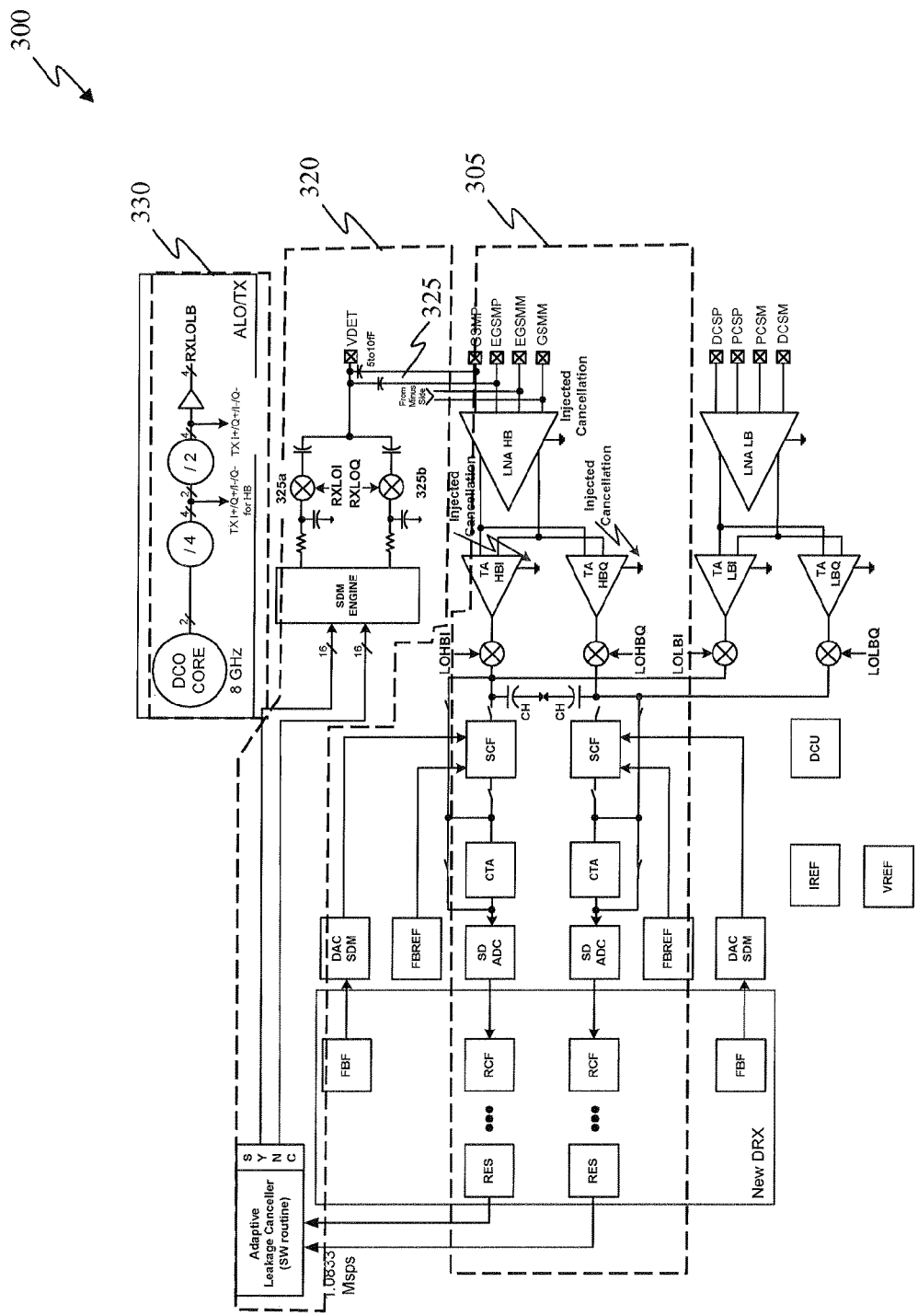
FIG. 3 illustrates yet another receiver embodiment employing a different coupling of an adapted leakage cancellation signal.

FIG. 3 illustrates yet another receiver embodiment, generally designated 300, employing a different coupling of an adapted leakage cancellation signal. The receiver 300 includes an exemplary receive channel 305 and an LO leakage controller 320 that couples the adapted leakage cancellation signal directly to an input 325 of a low noise amplifier (LNA) in the receive channel 305. The leakage cancellation signal is adapted by up-conversion mixers 325a, 325b for application to the input 325 of the LNA. In this embodiment, the LO leakage cancellation signal is converted to the analog domain by passing the output of the SDM engine through a low-pass filter. This output is then up-converted through mixers.

Figure 4:
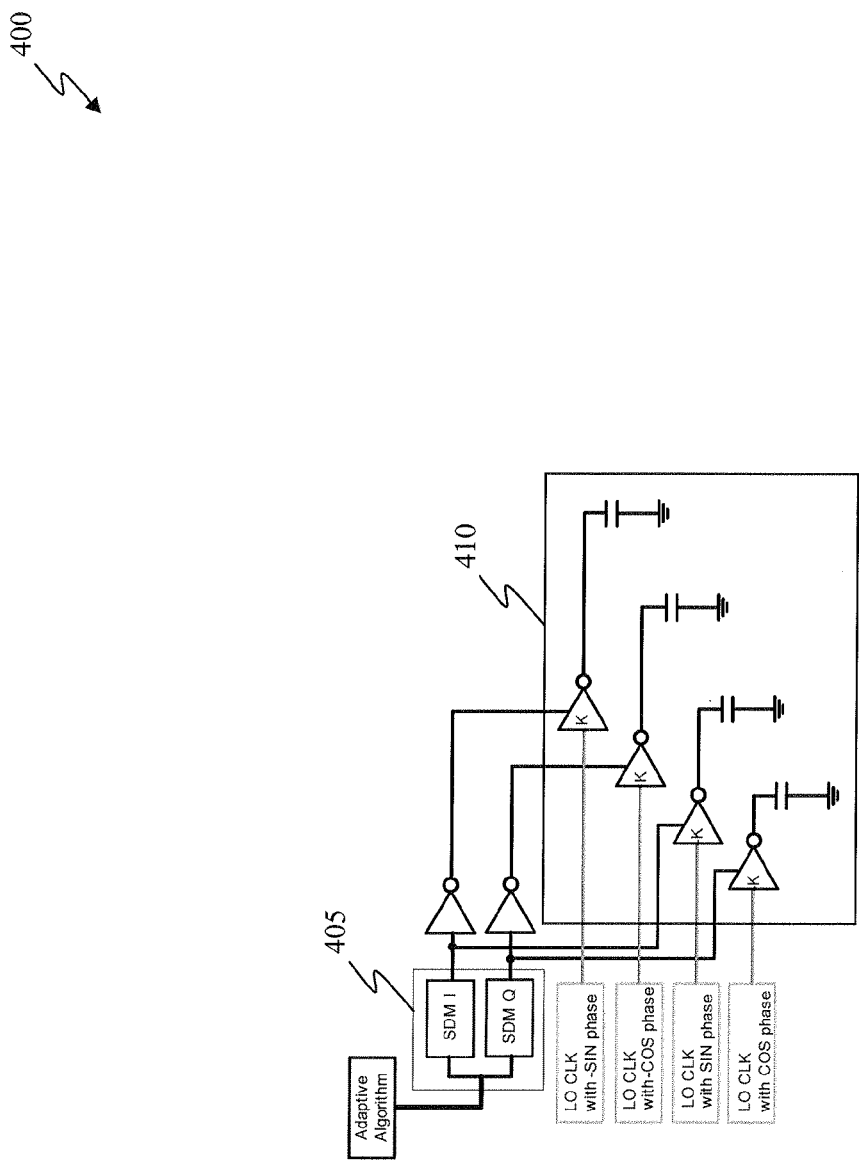
FIG. 4 illustrates an embodiment of a leakage counterbalance unit employing single LO signal buffers for each phase of the LO signal.

FIG. 4 illustrates an embodiment of a leakage counterbalance unit, generally designated 400, employing single LO signal buffers for each phase of the LO signal. The leakage counterbalance unit 400 includes an SDM engine 405 and LO signal buffers 410. The SDM engine 405 provides SDMI and SDMQ signals, as shown to drive amplitude control for the LO signal buffers 410. Multiphase driving signals are employed corresponding to cosine, sine, negative cosine and negative sine functions of the LO signal. In this embodiment, each of the LO signal buffers 410 provides a single driver for each quadrature, which drives a dummy load consisting of a capacitor.

The output bit stream of SDMI controls ON and OFF of corresponding cosine (I+) and negative cosine drivers (I−). If its output is a '1', the cosine buffer is turned ON, and the power system will receive periodic impulses that are phase-aligned with the cosine of the LO signal. When the output of SDMI is a '0', the negative cosine buffer is turned ON, and periodic impulses that are phase-aligned with the negative cosine of the LO signal are injected into the power system.

The average SDMI output is determined by the input value of SDM engine. That is, when the input value to its DAC is a, each I+ and I− buffer is turned on b and c times satisfying $$a = \frac{(b+c)}{W}$$

where W indicates a reasonably long time window. As a result, I+ and I− signals with amplitude a are injected into the power system from the viewpoint of time averaging. Similarity, the sine (Q+) and negative sine (Q−) signals having arbitrary amplitudes may be synthesized and injected into the power system.

Suppose both $\alpha \cos \omega_c t$ and $\beta \sin \omega_c t$ are synthesized by the I and Q portions of the SDM engine. If I and Q buffers are turned ON simultaneously, the power system will be slammed with two impulse sequences; one phase-aligned with I+ and the other phase-aligned with Q+. A close observation of the impulse would reveal that these have an approximately triangular envelope. The frequency contents of these impulses demonstrate an envelope that is very close to $$\sin^2 \frac{x}{(x^2)}$$

or sin c²x. For both sequences, one phase-aligned to I+ and the other phase-aligned to Q+, the period will be the same with a 90° phase difference between them. This creates a resultant vector of θ phase, where $$\theta = \arctan\left(\frac{\beta}{\alpha}\right).$$

If α and β are the same value, the resultant vector has a 45° phase. A disadvantage of this scheme is that a larger-than-needed anti-LO leakage signal may be injected instantaneously even though cancellation is occurring from an average viewpoint.

The entire input to the sigma-delta modulator may not be converted to a sigma-delta modulated output. Part of the input may be separated and converted to the oversampled, sigma-delta modulated output stream that drives a partitioning of the I and Q buffers. The remaining input can directly control the remaining I and Q buffers. Hence, some I and Q outputs turn on the LO signal buffers at an oversampled rate, while the remaining outputs turn on the remaining LO signal buffers at the Nyquist rate. The latter buffers will be referred to "Nyquist" buffers.

Figure 5:
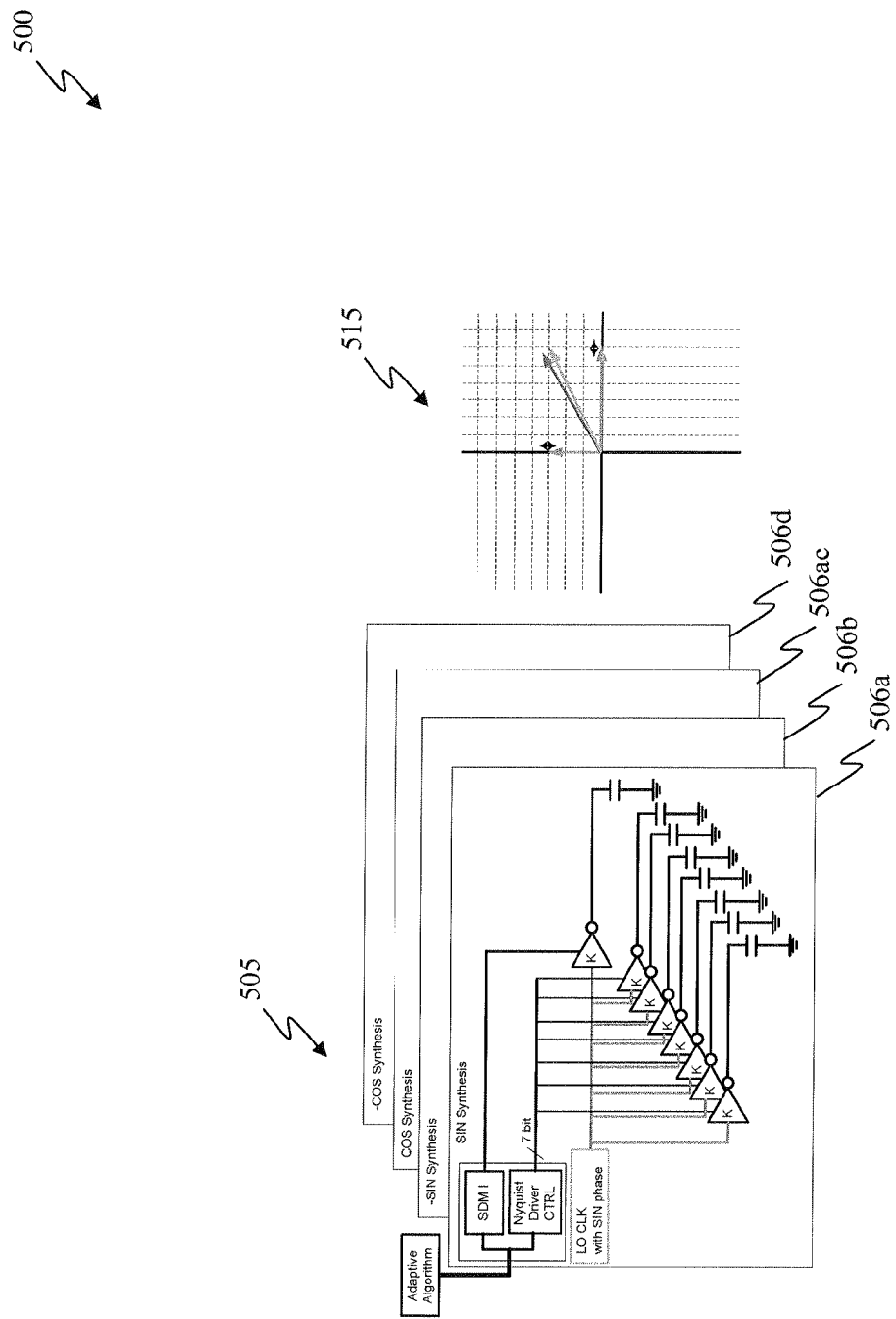
FIG. 5 illustrates another embodiment of a leakage counterbalance unit employing Nyquist drivers and sigma delta dither.

FIG. 5 illustrates another embodiment of a leakage counterbalance unit, generally designated 500, employing Nyquist drivers and sigma delta dither. A leakage counterbalance unit 505 includes multiple buffers that are employed with each of the multiphase components of the LO signal (represented graphically by the planes 506a-506d). Additionally, the SDM engine provides dithering of at least a portion of the adapted leakage cancellation signal.

In this approach, multiple buffers are used with a multi-bit (N-bit) SDM engine to turn the buffers ON and OFF. Compared with the single driver approach, improved resolution in the time domain is achieved. For example, suppose that N-bit buffers are being used, wherein the N-bit buffer represents a DAC with N-input bits. N can be partitioned as N=K+k with K bits are controlled at the Nyquist rate by a Nyquist driver and k bits controlled using a k-bit SDM engine. For example, let K=7 and k=1.

Then, to compose a vector $V_O$ a vector $V_1$ may be constructed by turning ON six drivers for I+ and three drivers for Q+. The difference of the two vectors ($V_O$−$V_1$) is adjusted by a sigma-delta dithering operation as shown in a corresponding grid 515. Here, the Nyquist driver determines the points on grid 515 and the SDM dithering allows the vector shown to be positioned between the points.

Figure 6:
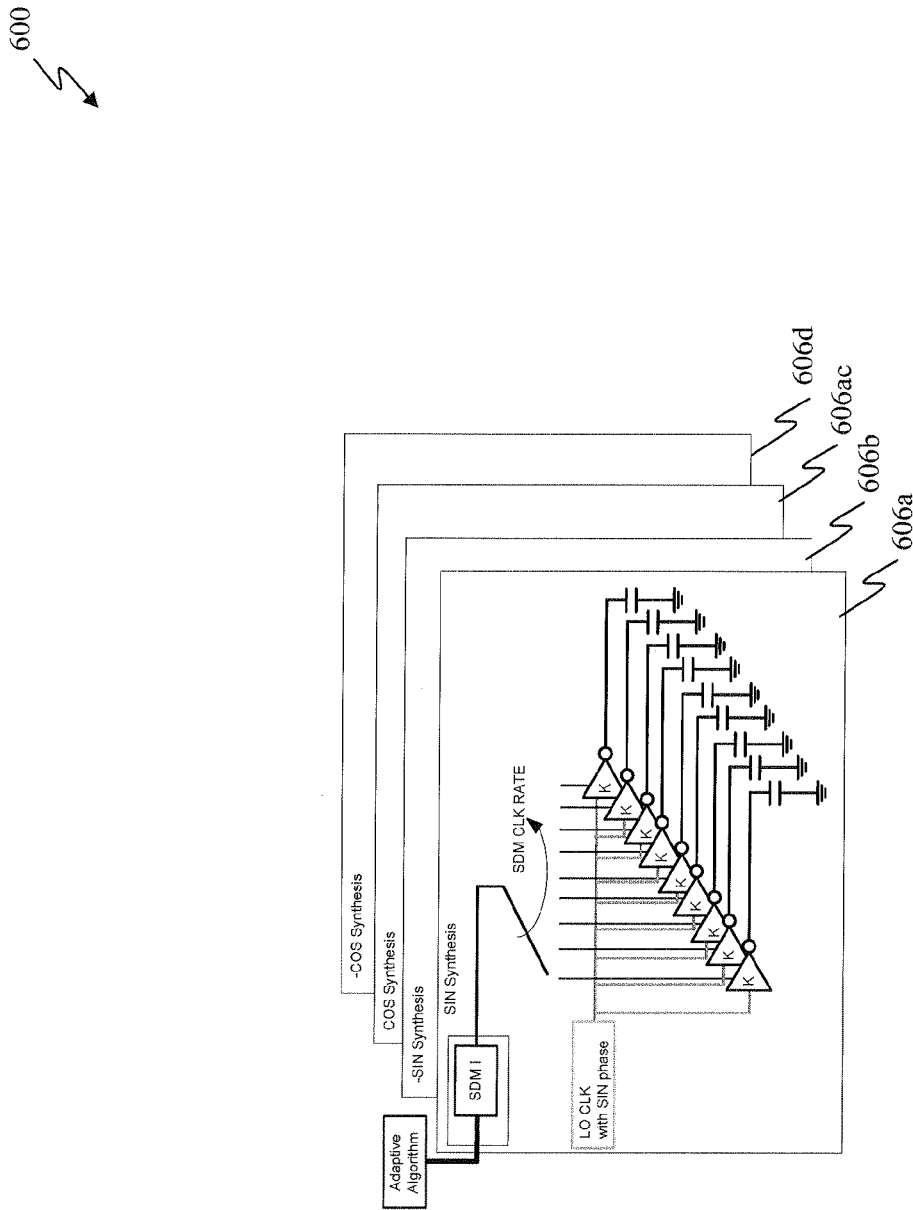
FIG. 6 illustrates yet another embodiment of a leakage counterbalance unit employing time averaging of the adapted leakage cancellation signal.

FIG. 6 illustrates yet another embodiment of a leakage counterbalance unit, generally designated 600, employing time averaging of the adapted leakage cancellation signal. The leakage counterbalance unit 600 includes a plurality of drivers representing each of the four phases (again, shown graphically as planes 606a-606d). In this embodiment, the appropriate phase of the SDM engine provides time averaging of the adapted leakage cancellation signal. This approach enhances the instantaneous property of the synthesized anti-leakage signal. The output of a single bit SDM engine is de-multiplexed to N drivers at the same clock rate as the SDM engine. The output of each driver in maintained for N consecutive periods of SDM clock. This effectively provides a latched signal to the power system in the time domain. As a result, an effective moving average of the injected anti-leakage signals is achieved.

Figure 7:
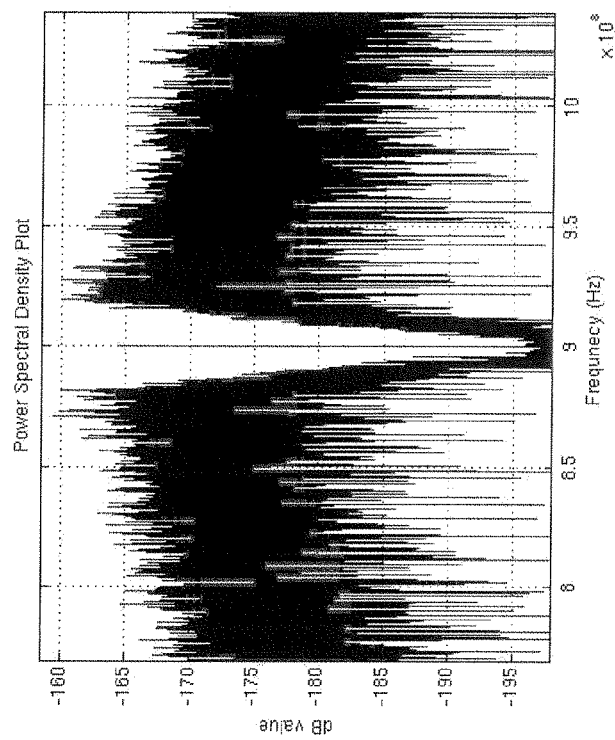
FIG. 7 illustrates a spectral density plot of an improvement in LO leakage after application of an adapted leakage cancellation signal.

FIG. 7 illustrates a spectral density plot of an improvement in LO leakage, generally designated 700, after application of an adapted leakage cancellation signal. The counterbalanced LO leakage spectrum 700 shows an improvement of 35 to 40 Db in the LO leakage level. This reduced LO leakage improves IP2 of LNA and TAMIX modules.

Figure 8:
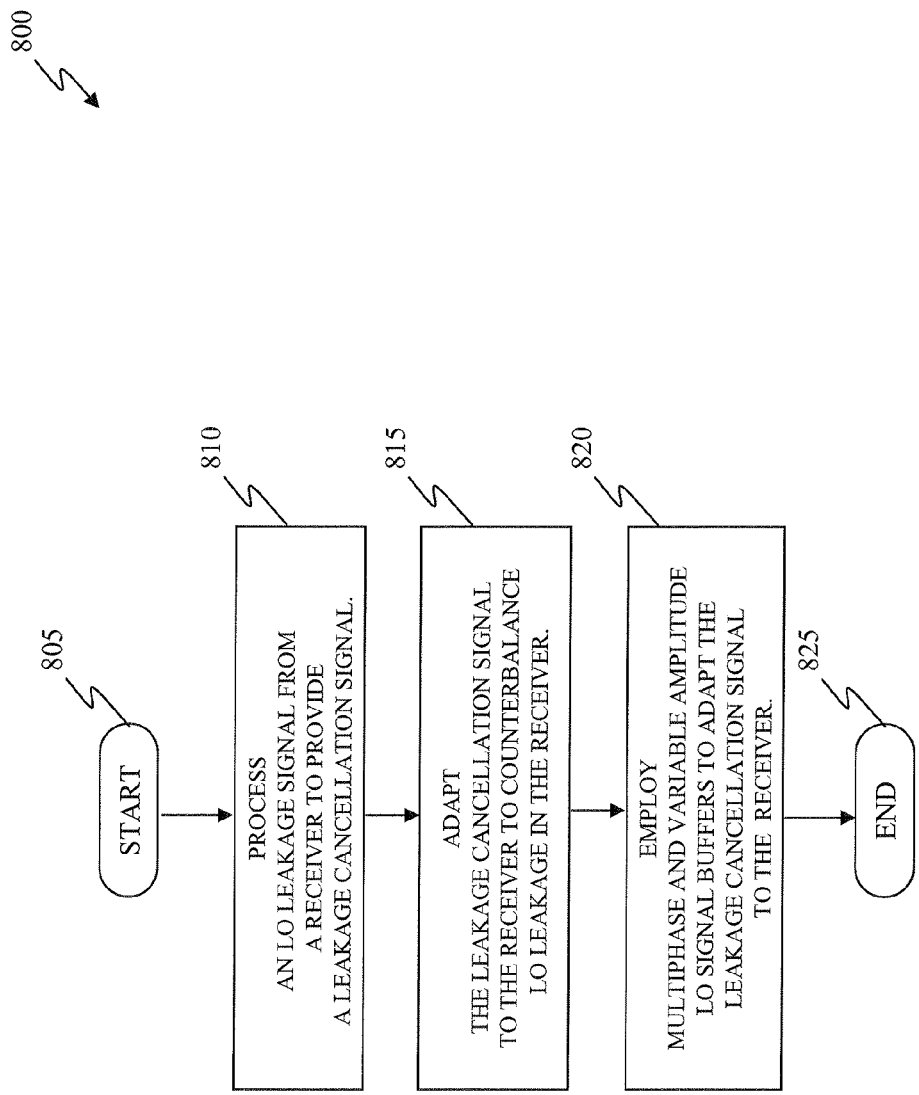
FIG. 8 illustrates a flow diagram of a method of operating an LO leakage controller.

FIG. 8 illustrates a method, generally designated 800, of operating an LO leakage controller. The method 800 is for use with a receiver and starts in a step 805. Then, in a step 810, an LO leakage error signal from the receiver is processed to provide a leakage cancellation signal. Processing the LO leakage error signal may employ a software program, a firmware program or a hardwired program to provide the leakage cancellation signal.

Additionally, the processing may employ various well known algorithms on the LO leakage error signal to provide the required leakage cancellation signal. These include a least square algorithm, a mean square error reduction algorithm or a zero forcing algorithm. Alternately, an algorithm that has been specifically developed for this application may be employed.

The leakage cancellation signal is then adapted to the receiver to counterbalance the LO leakage in the receiver, in a step 815. In one embodiment, the adapted leakage cancellation signal is applied to a ground of the receiver. In an alternative embodiment, the adapted leakage cancellation signal is applied to a bondwire of the receiver. Coupling through the bondwire signifies magnetic coupling of canceling energy from the source to the LNA input. This coupling may also be achieved through one of many other means such as parasitic coupling and inductive or capacitive coupling inside the integrated circuit, the package or on the board. Each of these embodiments allows the adapted leakage cancellation signal to be broadly applied to the receiver thereby providing the potential for a more encompassing counterbalancing of LO leakage. In yet another embodiment, the leakage cancellation signal is generated in baseband using DACs for I and Q paths and adapted by up-conversion mixers for application to an input of a low noise amplifier in the receiver using one of the coupling methods described earlier.

Multiphase and variable amplitude LO signal buffers are employed to adapt the leakage cancellation signal for application to the receiver in a step 820. In one embodiment, phases of the adapted leakage cancellation signal correspond to cosine, sine, negative cosine and negative sine functions of the LO signal. Additionally, amplitudes of the adapted leakage cancellation signal are controlled by a sigma delta modulation engine. In an alternative embodiment, the sigma delta modulation engine is employed to provide time averaging of the adapted leakage cancellation signal. In this case, the sigma delta modulation engine may be a single bit sigma delta modulation engine.

In yet another embodiment, amplitudes of the adapted leakage cancellation signal are controlled by a Nyquist driver and a sigma delta modulation engine. In this embodiment, the sigma delta modulation engine provides dithering of at least a portion of the adapted leakage cancellation signal. The method 800 ends in a step 825.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps is not a limitation of the present invention.

Those skilled in the art to which the invention relates will appreciate that other and further additions, deletions, substitutions and modifications may be made to the described embodiments without departing from the scope of the invention.

What is claimed is:

1. A local oscillator (LO) leakage controller for use with a receiver, comprising:
   a comparison unit configured to process an LO leakage error signal from the receiver to provide a leakage cancellation signal; and
   a leakage counterbalance unit coupled to the comparison unit and configured to adapt the leakage cancellation signal to the receiver to counterbalance LO leakage in the receiver;
   wherein the leakage cancellation signal is adapted for application to a ground of the receiver.

2. The controller as recited in claim 1 wherein processing the LO leakage error signal employs one selected from the group consisting of:
   a software program;
   a firmware program; and
   a hardwired program.

3. The controller as recited in claim 1 wherein processing the LO leakage error signal employs one selected from the group consisting of
   a least square algorithm;
   a mean square error reduction algorithm; and
   a zero forcing algorithm.

4. The controller as recited in claim 1 wherein the leakage cancellation signal is adapted for application to a ground of the receiver.

5. A local oscillator (LO) leakage controller for use with a receiver, comprising:
   a comparison unit configured to process an LO leakage error signal from the receiver to provide a leakage cancellation signal; and
   a leakage counterbalance unit coupled to the comparison unit and configured to adapt the leakage cancellation signal to the receiver to counterbalance LO leakage in the receiver;
   wherein the leakage cancellation signal is adapted for application to a bondwire of the receiver.

6. A local oscillator (LO) leakage controller for use with a receiver, comprising:
   a comparison unit configured to process an LO leakage error signal from the receiver to provide a leakage cancellation signal; and
   a leakage counterbalance unit coupled to the comparison unit and configured to adapt the leakage cancellation signal to the receiver to counterbalance LO leakage in the receiver;
   wherein multiphase and variable amplitude LO signal buffers adapt the leakage cancellation signal for application to the receiver;
   wherein amplitudes of the adapted leakage cancellation signal are controlled by a sigma delta modulation engine.

7. The controller as recited in claim 6 wherein phases of the adapted leakage cancellation signal correspond to cosine, sine, negative cosine and negative sine functions of the LO signal.

8. The controller as recited in claim 6 wherein the sigma delta modulation engine provides time averaging of the adapted leakage cancellation signal.

9. The controller as recited in claim 8 wherein the sigma delta modulation engine is a single bit sigma delta modulation engine.

10. A local oscillator (LO) leakage controller for use with a receiver, comprising:
    a comparison unit configured to process an LO leakage error signal for the receiver to provide a leakage cancellation signal; and
    a leakage counterbalance unit coupled to the comparison unit and configured to adapt the leakage cancellation signal to the receiver to counterbalance LO leakage in the receiver;
    wherein multiphase and variable amplitude LO signal buffers adapt the leakage cancellation signal for application to the receiver;
    wherein amplitudes of the adapted leakage cancellation signal are controlled by a Nyquist driver and a sigma delta modulation engine.

11. The controller as recited in claim 10 wherein the sigma delta modulation engine provides dithering of at least a portion of the adapted leakage cancellation signal.

12. A local oscillator (LO) leakage controller for use with a receiver, comprising:
    a comparison unit configured to process an LO leakage error signal for the receiver to provide a leakage cancellation signal; and
    a leakage counterbalance unit coupled to the comparison unit and configured to adapt the leakage cancellation signal to the receiver to counterbalance LO leakage in the receiver;
    wherein the leakage cancellation signal is adapted by up-conversion mixers for application to an input of a low noise amplifier in the receiver.

13. A method of operating a local oscillator (LO) leakage controller for use with a receiver, comprising:

processing an LO leakage error signal from the receiver to provide a leakage cancellation signal; and adapting the leakage cancellation signal to the receiver to counterbalance LO leakage in the receiver;

wherein the leakage cancellation signal is adapted for application to a ground of the receiver.

14. The method as recited in claim 13 wherein processing the LO leakage error signal employs one selected from the group consisting of:

a software program;
a firmware program; and
a hardwired program.

15. The method as recited in claim 13 wherein processing the LO leakage error signal employs one selected from the group consisting of:

a least square algorithm
a mean square error reduction algorithm; and
a zero forcing algorithm.

16. A method of operating a local oscillator (LO) leakage controller for use with a receiver, comprising:

processing an LO leakage error signal from the receiver to provide a leakage cancellation signal; and adapting the leakage cancellation signal to the receiver to counterbalance LO leakage in the receiver;

wherein the leakage cancellation signal is adapted for application to a bondwire of the receiver.

17. A method of operating a local oscillator (LO) leakage controller for use with a receiver, comprising;

processing an LO leakage error signal for the receiver to provide a leakage cancellation signal; and adapting the leakage cancellation signal to the receiver to counterbalance LO leakage in the receiver;

wherein amplitudes of the adapted leakage cancellation signal are controlled by a sigma delta modulation engine.

18. The method as recited in claim 17 wherein phases of the adapted leakage cancellation signal correspond to cosine, sine, negative cosine and negative sine functions of the LO signal.

19. The method as recited in claim 17 wherein the sigma delta modulation engine provides time averaging of the adapted leakage cancellation signal.

20. The method as recited in claim 19 wherein the sigma delta modulation engine is a single bit sigma delta modulation engine.

21. A method of operating a local oscillator (LO) leakage controller for use with a receiver, comprising:

processing an LO leakage error signal from the receiver to provide a leakage cancellation signal; and adapting the leakage cancellation signal to the receiver to counterbalance LO leakage in the receiver;

wherein multiphase and variable amplitude LO signal buffers adapt the leakage cancellation signal for application to the receiver;

wherein amplitudes of the adapted leakage cancellation signal are controlled by a Nyquist driver and a sigma delta modulation engine.

22. The method as recited in claim 21 wherein the sigma delta modulation engine provides dithering of at least a portion of the adapted leakage cancellation signal.

23. A method of operating a local oscillator (LO) leakage controller for use with a receiver, comprising:

processing an LO leakage error signal from the receiver to provide a leakage cancellation signal; and adapting the leakage cancellation signal to the receiver to counterbalance LO leakage in the receiver;

wherein the leakage cancellation signal is adapted by up-conversion mixers for application to an input of a low noise amplifier in the receiver.

* * * * *